US008444763B2

(12) United States Patent
Huynh

(10) Patent No.: US 8,444,763 B2
(45) Date of Patent: May 21, 2013

(54) GEOPOLYMER CEMENT AND USE THEROF

(75) Inventor: Hieu Thao Huynh, Gretz Armainvilliers (FR)

(73) Assignee: Institut Francais des Sciences et Technologies des Transports, de l'Amenagement et des Reseaux, Champs sur Marne (FR)

(*) Notice: Subject to any disclaimer, the term of this patent is extended or adjusted under 35 U.S.C. 154(b) by 0 days.

(21) Appl. No.: 13/389,936

(22) PCT Filed: Aug. 20, 2010

(86) PCT No.: PCT/FR2010/051746
§ 371 (c)(1),
(2), (4) Date: Mar. 8, 2012

(87) PCT Pub. No.: WO2011/020975
PCT Pub. Date: Feb. 24, 2011

(65) Prior Publication Data
US 2012/0192765 A1    Aug. 2, 2012

(30) Foreign Application Priority Data
Aug. 21, 2009  (FR) ................................... 09 55740

(51) Int. Cl.
C04B 28/00 (2006.01)
C04B 12/04 (2006.01)
C04B 24/24 (2006.01)
C04B 28/26 (2006.01)
C04B 14/10 (2006.01)
C04B 103/32 (2006.01)

(52) U.S. Cl.
USPC ........... 106/632; 106/600; 106/620; 106/624; 106/631; 106/634

(58) Field of Classification Search
USPC ................. 106/600, 624, 631, 632, 634, 620
See application file for complete search history.

(56) References Cited

U.S. PATENT DOCUMENTS

| 4,640,715 A | 2/1987 | Heitzmann et al. |
| 4,642,137 A | 2/1987 | Heitzmann et al. |
| 5,084,102 A | 1/1992 | Brouns et al. |
| 5,362,324 A | 11/1994 | Cerulli et al. |
| 2004/0255823 A1 | 12/2004 | Comrie |
| 2005/0172860 A1 | 8/2005 | Davidovits et al. |
| 2008/0028994 A1 | 2/2008 | Barlet-Gouedard et al. |
| 2010/0010139 A1 | 1/2010 | Davidovits et al. |

FOREIGN PATENT DOCUMENTS

| AU | 4039893 | 11/1993 |
| EP | 0 612 702 | 8/1994 |
| FR | 2904307 A1 * | 2/2008 |
| JP | 09-077538 A * | 3/1997 |
| JP | 2003-081672 A * | 3/2003 |
| JP | 2006-290673 A * | 10/2006 |
| JP | 2006-321662 A * | 11/2006 |
| WO | WO93/21126 | 10/1993 |
| WO | WO03/099738 | 12/2003 |
| WO | WO2005/019130 | 3/2005 |
| WO | WO2008/012438 | 1/2008 |
| WO | WO2008/113609 | 9/2008 |

OTHER PUBLICATIONS

Singh et al. "Geopolymer Formation Processes at Room Temperature Studied by <29>Si and <27>Al MAS-NMR", Materials Science and Engineering, vol. 396, No. 1-2, (Apr. 15, 2005), pp. 392-402.
Palacios et al. "Effect of Superplasticizer and Shrinkage-Reducing Admixtures on Alkali-Activaed Slag Pastes and Mortars", Cement and Concrete Research, vol. 35, No. 7, (Jul. 1, 2005), pp. 1358-1367.
Collepardi et al. "Recent Developments in Superplasticizers", International Concrete Research & Information Portal, Special Publication, vol. 239, (Oct. 1, 2006), pp. 1-14.
Hardjito et al. "Factors Influencing the Compressive Strength of Fly Ash-Based Geopolymer Concrete", Civil Engineering Dimension, vol. 6, No. 2, (Sep. 2004) pp. 88-93.
Puertas et al,, "Effect of Superplasticisers on the Behaviour and Properties of Alkaline Cements", Advances in Cement Research, 2003, 15, No. 1, January (pp. 23-28).
Chindaprasirt et al., "Workability and Strength of Coarse High Calcium Fly Ash Geopolymer", Cement & Concrete Composites. 29, 2007, (pp. 224-229).

* cited by examiner

*Primary Examiner* — Anthony J Green
(74) *Attorney, Agent, or Firm* — Hamre, Schumann, Mueller & Larson, P.C.

(57) ABSTRACT

The present invention relates to a novel type of noncorrosive geopolymer cement in which said cement comprises a metakaolin or a mixture of metakaolin and non-thermally activated aluminosilicate, in a weight ratio comprised between about 40:60 and about 80:20, and an alkaline silicate solution having a molar ratio $M_2O:SiO_2$ comprised between about 0.51 and 0.60, M representing Na or K, and to the use of a superplasticizer comprising a crosslinked acrylic acid polymer in the manufacture of geopolymer cement.

19 Claims, No Drawings

GEOPOLYMER CEMENT AND USE THEROF

STATE OF THE ART

The present invention relates to the construction and building field. More specifically, the invention relates to a novel type of non-corrosive geopolymer cement.

Two types of cement exist, "hydraulic" cements, such as Portland cements, and "geopolymer" cements. The latter are known as geopolymer cements because they are based on inorganic geopolymer formed by the polymerization of aluminosilicate oxides in the presence of an alkaline activator, such as an alkaline polysilicate. The geopolymer thus obtained has a three-dimensional structure containing the Si—O—Al bond.

The production of geopolymer cement is significantly more ecological than the production of hydraulic cement, given that the formation of one metric ton of hydraulic cement generates approximately 1 metric ton of $CO_2$, whereas one metric ton of geopolymer cement generates only approximately 0.1 metric ton of $CO_2$. Furthermore, the total energy consumption involved in the production of geopolymer cement represents only approximately ⅓ of the energy consumption necessary for the production of hydraulic cement. This is because the production of hydraulic cement requires the burning of limestone and clay at very high temperature (of the order of 1450° C.), whereas the kaolins generally used in the production of geopolymer cement require burning only at a temperature of approximately 750° C.

Due to the need to use an alkaline entity to activate the polymerization of the aluminosilicate mixture, geopolymer cements are generally classified in the category of "corrosive" substances with reference to European Directives 67/548/EEC (dangerous substances) and 91/155/EEC (dangerous preparations) owing to the fact that the molar ratio of alkaline silicates $M_2O:SiO_2$ (M generally being an alkali metal, such as sodium (M=Na) or potassium (M=K)) of the solution of activators is greater than 0.625.

On the other hand, hydraulic cements are generally classified in the category of "irritant" substances with reference to the above European Directives, that is to say having a molar ratio $M_2O:SiO_2$ of less than 0.625.

The geopolymer cements of the prior art are generally activated by an alkaline silicate solution having a molar ratio $M_2O:SiO_2$ above the limit of 0.625 imposed by the European Directives and are thus regarded as corrosive. Mention may be made, as examples, of patents U.S. Pat. No. 4,640,715 (molar ratio $M_2O:SiO_2$ equal to 3.0), U.S. Pat. No. 4,642,137 (molar ratio $M_2O:SiO_2$ greater than 1) and U.S. Pat. No. 5,084,102 (molar ratio $M_2O:SiO_2$ between 0.83 and 1.25), as well as international application WO 2005/019130 (molar ratio $M_2O:SiO_2$ equal to 3.22). International application WO 03/099738 refers to a silicate solution for which the molar ratio $M_2O:SiO_2$ is between 0.5 and 0.8; however, the examples of this patent application employ the same potassium silicate solution having a molar ratio $K_2O:SiO_2$ equal to 0.78. It may also be noted that the paper by Puyam S. Singh et al., published in the review "Material Science and Engineering A", volume 396, 2005, pages 392-402, describes the preparation of geopolymer cements from an alkaline silicate solution having a molar ratio $Na_2O:SiO_2$ of greater than 0.625 (and thus corrosive). These high values are essentially due to the presence of additional $Na_2O$ originating from the addition of anhydrous NaOH necessary to allow sufficient activation of the polymerization reaction.

Therefore, so as to avoid any accident in the handling or by inhalation at the time of the preparation of the geopolymer cement, it is preferable for a person skilled in the art to work with "irritant" rather than "non-corrosive" substances.

It is also desirable to have available a "non-corrosive" geopolymer cement which makes it possible to obtain concretes or mortars exhibiting mechanical properties (plasticity and workability before curing and mechanical strength after curing) suitable for use in the building construction. It may be noted that the compressive strength of a mortar suitable for being used in the construction of buildings is at least 25 MPa.

The solutions of alkaline activators used in the production of geopolymer cement are aqueous solutions. Consequently, the addition of these solutions contributes to increasing the amount of water present in the geopolymer cement, which can result in a reduction in the mechanical strength of the cement thus formed. Conversely, decreasing the amount of solution of activators used too drastically and thus the amount of water present in the mixture would result in a loss in plasticity and thus in workability, resulting in very short curing times for the cement which are generally incompatible with the desired use. It is therefore desirable to be able to control the amount of alkaline silicate solution used in a geopolymer cement, without affecting the mechanical properties of the cement, mortar or concrete obtained from said geopolymer cement.

DESCRIPTION OF THE INVENTION

The present invention pertains to a "non-corrosive" geopolymer cement for use in the manufacture of cement, mortar or concrete which retains appropriate mechanical properties suitable for being used in the field of construction and building.

According to a first aspect, the invention relates to a geopolymer cement comprising a) a metakaolin or a mixture of metakaolin and a non-thermally activated aluminosilicate, and b) an alkaline silicate solution having a molar ratio $M_2O:SiO_2$ comprised between 0.51 and 0.60, M representing Na or K.

Advantageously, component a) is a mixture of metakaolin and non-thermally activated aluminosilicate in a weight ratio comprised between about 40:60 and about 80:20 and preferably between about 50:50 and about 80:20.

"Non-thermally activated aluminosilicate" is understood to mean an aluminosilicate selected from the group consisting of kaolin, bentonite, flyash, blast furnace slag and a mixture of these compounds. Preferably, the aluminosilicate is kaolin or bentonite.

The alkaline silicate solution preferably has a molar ratio $M_2O:SiO_2$ comprised between 0.51 and 0.57, more preferably between 0.53 and 0.57. According to a preferred embodiment of the invention, a sodium (M=Na) silicate solution is used.

The geopolymer cement according to the invention is obtained by mixing components a) and b) according to techniques well known to a person skilled in the art.

The alkaline silicate solution according to the invention may be a commercial solution which may be used as provided insofar as it exhibits a molar ratio $M_2O:SiO_2$ comprised between 0.51 and 0.60.

The alkaline silicate solution according to the invention may alternatively be obtained from a precursor solution (commercial or non-commercial) having a molar ratio $M_2O:SiO_2$ initially not within the abovementioned range of values but may subsequently be adjusted with an appropriate amount of alkaline hydroxide MOH (anhydrous or in solution) in order to obtain an alkaline silicate solution having a molar ratio $M_2O:SiO_2$ within the range of values according to the invention.

The addition of the alkaline hydroxide may be carried out before or after the mixing of the alkaline silicate solution with the metakaolin (or with the mixture of metakaolin and non-thermally activated aluminosilicate).

Under these conditions, the molar amount of $M_2O$ to be used in the calculation of the molar ratio $M_2O:SiO_2$ according to the invention is the amount originating from the precursor silicate solution, before it is mixed with the metakaolin (or the mixture of metakaolin and non-thermally activated aluminosilicate), and the amount originating from the alkaline hydroxide MOH added.

It should thus be noted that the term "alkaline silicate solution" is understood to mean the solution which makes it possible to activate the polymerization reaction of a metakaolin or a mixture of metakaolin and a non-thermally activated aluminosilicate, before or after any possible adjustments of the molar ratio $M_2O:SiO_2$ by addition of one or more reactants, such as an alkaline hydroxide MOH, whether the addition takes place before or after the mixing of the alkaline silicate solution and the metakaolin or the mixture of metakaolin and non-thermally activated aluminosilicate.

The alkaline silicate solution generally has a water content by weight comprised between 55 and 63%.

The metakaolin (or calcined kaolin) used in the context of the present invention is a dehydroxylated aluminosilicate of general composition $Al_2O_3.2Si_2O_2$. It is an artificial pozzolana in the amorphous state, the particles of which exhibit a lamellar shape. It is obtained by calcining and grinding a kaolinite clay in a flash calciner in order to obtain a hyper-reactive product with a d50 value of between 1 and 2 μm (BET specific surface of approximately 19 m$^2$/g). The particles are first placed in a chamber having a temperature which can reach from 900 to 1000° C. for a very short time, so that the heat exchanges bring the particles to a moderate temperature of about 750-850° C.

The kaolin used in the context of the present invention is a clay of the family of the aluminosilicates which is ground and dried, with a d50 of less than 1 μm. It exhibits a BET specific surface of approximately 22 m$^2$/g.

The bentonite used in the context of the present invention is a clay from the family of the smectites exhibiting a high swelling capacity with water. Its specific surface is comprised between approximately 80 and 150 m$^2$/g.

The blast furnace slag used in the context of the present invention is a co-product for the manufacture of cast iron, resulting from a high temperature treatment of agglomerated iron ore and coke. The ground slag has a Blaine specific surface comprised between approximately 4350 and 4380 cm$^2$/g.

The flyashes used in the context of the present invention are class F flyashes resulting from the combustion of pulverized coal in a fossil fuel power plant at a temperature of approximately 1400° C. The flyashes, having a Blaine fineness of between approximately 1900 and 2500 cm$^2$/g, are provided in the form of a gray powder containing solid or hollow spheres of vitreous nature.

In order to improve the rheology of the mortars and concretes prepared using the geopolymer cement according to the invention, it is possible to add various adjuvants well known to a person skilled in the art.

At the present time, studies carried out on adjuvants of the "superplasticizer" type have failed to demonstrate any improvement in the mechanical properties of the cements, mortars or concretes prepared from geopolymer binders incorporating such "superplasticizers" (see in particular Puertas et al.—*Advances in Cement Research*, 2003, 15, No. 1, January, 23-28; Palacios and Puertas—*Cement and Concrete Research*, 2005, 35, 1358-1367; Chindaprasirt et al.—*Cement and Concrete Composites*, 2007, 29, 224-229).

Unexpectedly, it has been found, entirely surprisingly, that the use of a crosslinked acrylic acid polymer as superplasticizer makes it possible to reduce the amount of alkaline silicate solution used and thus the amount of water present in the geopolymer cement, while improving the mechanical strengths of the cements, mortars or concretes obtained from said geopolymer cement.

Thus, according to another aspect, the invention relates to a geopolymer cement comprising a) a metakaolin or a mixture of metakaolin and a non-thermally activated aluminosilicate, b) an alkaline silicate solution having a molar ratio $M_2O:SiO_2$ comprised between 0.51 and 0.60, M representing Na or K, and c) a superplasticizer comprising a crosslinked acrylic acid polymer.

Components a) and b) are as defined above. Advantageously, the superplasticizer is a crosslinked acrylic acid homopolymer and, preferably, the superplasticizer is an acrylic acid homopolymer crosslinked with polyalkenyl ethers or divinyl glycol. Such homopolymers (also known as carbomers), are sold by Lubrizol under the name Carbopol®. A particularly preferred homopolymer is the carbomer sold under the name Carbopol® Ultrez 10.

Advantageously, the superplasticizer is used in the form of an aqueous solution preferably obtained by a process comprising the steps of a) dissolving the carbomer in distilled water and b) partially neutralizing the obtained solution with an inorganic or organic base so as to obtain a gel. The solid content by weight of the aqueous superplasticizer solution is comprised between about 0.5% and about 2%.

One of the advantages associated with the use of a crosslinked acrylic acid polymer lies in the fact that a small amount is necessary in order to obtain the above mentioned properties. This contributes to the reduction in the cost of manufacture of the geopolymer cement. Thus, the amount of superplasticizer used is advantageously comprised between about 0.01% and about 0.04% by weight of solid content, with respect to the total amount of geopolymer cement, preferably comprised between about 0.016% and about 0.027%.

According to another aspect, the invention relates to the use of a superplasticizer comprising a crosslinked carboxylic acid polymer as defined above in the manufacture of a geopolymer cement, of a mortar or of a concrete.

The geopolymer cement according to the invention has a molar ratio $SiO_2:Al_2O_3$ comprised between about 4.0 and about 5.2, a molar ratio $Na_2O:SiO_2$ comprised between about 0.2 and about 0.3, a molar ratio $Na_2O:Al_2O_3$ comprised between about 0.85 and about 1.4, and a molar ratio $H_2O:Na_2O$ comprised between about 14.5 and about 16.5.

The geopolymer cement according to the invention may be used in the manufacture of mortars or concretes, in which the cement is mixed with aggregates, such as sand, sand/gravel mixture or gravel. For example, for the formulation of mortars, the composition preferably comprises approximately 10% by weight of metakaolin, approximately 10% by weight of non-thermally activated aluminosilicate, at most approximately 20% by weight of alkaline silicate solution and approximately 0.5% by weight of superplasticizer according to the invention, the rest being composed of aggregates.

Naturally, the mortars and concretes produced from the geopolymer cement according to the invention may comprise one or more additives commonly used in the field of the invention, for example an air-entraining agent.

By way of indication, the mortars obtained from the geopolymer cement have a compressive strength at 28 days, measured according to standard NF EN 196-1, of at least 28 MPa, generally comprised between about 30 MPa and about 56 MPa and preferably between about 30 and about 45 MPa.

Advantageously, reinforcing fibers may be used in combination with the geopolymer cement according to the invention for the manufacture of mortars and concretes. These fibers can be of metallic, organic (synthetic or natural (hemp, flax or bamboo, for example)) or inorganic origin and preferably of synthetic organic origin.

Thus, the mortar or concrete comprising the geopolymer cement according to the invention may also comprise fibers, preferably organic fibers and more preferably synthetic organic fibers of aramid polymer type preferably chosen from polyacrylonitrile fibers, polyvinyl alcohol fibers, polyamide fibers, high density polyethylene fibers and polypropylene fibers.

Purely by way of indication, it will be noted that the mortars or concretes thus obtained are generally referred to by a person skilled in the art as "fiber-reinforced mortars" or "fiber-reinforced concretes".

It will also be noted that the order of addition of the components constituting the geopolymer cement according to the invention and the concretes and mortars prepared from this cement, that is to say, for example, the metakaolin or the mixture of metakaolin and non-thermally activated aluminosilicate, the alkaline silicate solution, the superplasticizer comprising a crosslinked acrylic acid polymer, the organic fibers and any other additive known to a person skilled in the art, is not important but, preferably, the geopolymer cement will first of all be prepared by mixing the metakaolin and optionally the non-thermally activated aluminosilicate, to which may then be added the reinforcing fibers, subsequently the alkaline silicate solution, then, subsequently, the other additives, such as the aggregates, and finally the superplasticizer, with or without air-entraining agent.

Naturally, the geopolymer cement according to the invention may also be used in the manufacture of cement pastes and grouts in combination with one or more additives/adjuvants as already mentioned above.

Cement pastes are suspensions of cement in water, that is to say, in the present case, the mixture of aluminosilicate and alkaline silicate solution. It will be noted that, in practice, pure cement paste is generally not used to any great extent and is generally used in the form of fluid mixtures known as "grouts", that is to say a cement paste in combination with one or more adjuvants (for example: plasticizer, superplasticizer, setting accelerator, setting retarder) and optionally certain additives (for example: clay, flyash, limestone fillers, slag, silica fume, very fine sand (0/1 mm)).

The grouts can be used in diverse and various applications, such as:
- the filling of joints and cracks;
- the injection into prestressing sheathings;
- the isolation of dangerous waste (chemical or radioactive waste) stored in hollowed-out cavities in saline formations;
- the sealing of tie rods;
- the preparation of semi-rigid floors;
- the use in the construction of oil wells.

The invention also relates to the use of a superplasticizer comprising a crosslinked carboxylic acid polymer as defined above in the manufacture of a grout.

The advantages related to the present invention are in particular the following:
- the production of a geopolymer cement classified as irritant cement and not as corrosive cement according to the European Directives in force;
- a reduction in the cost of production of the geopolymer cement due to the reduced amount of metakaolin used;
- a reduction in the cost of production of the geopolymer cement due to a reduced amount of alkaline silicate solution used;
- the curing of the geopolymer cement at ambient temperature;
- a reduction in the harmful impact on the environment, inter alia, by the reduction in the amount of energy used to produce the geopolymer cement;
- good plasticity and workability properties of the geopolymer cement and the maintenance of or an improvement in the mechanical properties of the mortars or concretes obtained from said cement.

A better understanding of the invention will be obtained with the help of the following examples, given purely by way of illustration.

In these examples, the following constituents are used:
metakaolin: product (as powder) sold under the name Argical-M 1200S by AGS Minéraux;
flyashes: product (as powder) sold under the name Silicoline® by Surschiste;
kaolin: product (as powder) sold under the name Argirec B24 by AGS Minéraux;
blast furnace slag: product (as powder) sold under the name crushed slag 0/4 by Slag;
bentonite: product (as powder) sold under the name Impersol by the Société Française des Bentonites et Dérivés;
aramid fibers: synthetic organic fibers sold under the name Technora® T321 by Teijin;
aqueous sodium silicate solutions: the following solutions are prepared from the product sold under the name sodium silicate solution TECHNICAL ($SiO_2$:$Na_2O$ by weight=3.25) and solid sodium hydroxide (97%) by VWR:
   solution 1: solution with a molar ratio $Na_2O$:$SiO_2$ equal to 0.54, containing 62.4% by weight of water
   solution 2: solution with a molar ratio $Na_2O$:$SiO_2$ equal to 0.53, containing 62.8% by weight of water
   solution 3: solution with a molar ratio $Na_2O$:$SiO_2$ equal to 0.57, containing 62.1% by weight of water
   solution 4: solution with a molar ratio $Na_2O$:$SiO_2$ equal to 0.51, containing 63% by weight of water
   solution 5: solution with a molar ratio $Na_2O$:$SiO_2$ equal to 0.53, containing 62.7% by weight of water
   solution 6: solution with a molar ratio $Na_2O$:$SiO_2$ equal to 0.57, containing 62.1% by weight of water
superplasticizer: product sold under the name Carbopol® Ultrez 10 by Lubrizol.

Step 1: Formulation of Mortars from the Geopolymer Cement according to the Invention The formulations having the compositions shown in table 1 were prepared (all the amounts are expressed in g).

TABLE 1

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 |
|---|---|---|---|---|---|---|---|---|---|---|---|---|---|---|---|
| metakaolin | 450 | 360 | 225 | 225 | 360 | 360 | 360 | 225 | 225 | 225 | 225 | 225 | 360 | 360 | 225 |
| flyashes | — | 90 | 225 | 225 | — | — | — | — | — | — | — | — | — | — | — |
| kaolin | — | — | — | — | 90 | 90 | — | — | — | — | — | — | — | — | — |
| slag | — | — | — | — | — | — | 90 | 225 | 225 | 225 | 225 | 225 | — | — | 225 |
| bentonite | — | — | — | — | — | — | — | — | — | — | — | — | 90 | 90 | — |
| solution 1 | 821 | — | — | — | 821 | 700 | — | — | — | — | — | — | — | — | — |
| solution 2 | — | 753 | — | — | — | — | — | — | — | — | — | — | — | — | — |
| solution 3 | — | — | 560 | 420 | — | — | — | 698 | 590 | 560 | 520 | 420 | — | — | — |
| solution 4 | — | — | — | — | — | — | 765 | — | — | — | — | — | — | — | — |
| solution 5 | — | — | — | — | — | — | — | — | — | — | — | — | 900 | 780 | — |
| solution 6 | — | — | — | — | — | — | — | — | — | — | — | — | — | — | 530 |
| superplasticizer | — | — | 7 | 12 | — | 10 | — | — | 7 | 7 | 8 | 12 | — | 12 | 12 |
| fibers | — | — | — | — | — | — | — | — | — | — | — | — | — | — | 9 |

Step 2: Preparation of Mortars and Determination of the Mechanical Strengths

A mortar was prepared according to a process well known to a person skilled in the art, namely: the powder constituents of the geopolymer cements prepared in step 1 was first mixed, at slow speed, with the corresponding aqueous sodium silicate solution for 30 seconds, the CEN standard sand (EN 196-1) was then introduced over a period of 30 seconds, in a proportion of three parts by weight of sand per one part by weight of metakaolin or mixture of metakaolin and non-thermally activated aluminosilicate, mixing was subsequently carried out at high speed for an additional period of 30 seconds and the mixer was stopped for 90 seconds. While the mixer was stopped, the superplasticizer was optionally added, the mixture was then scraped and high speed mixing was subsequently resumed for 60 seconds.

It will be noted that, when the reinforcing fibers are used, the latter are preferably mixed with the powder constituents of the cement before addition of the corresponding aqueous sodium silicate solution.

After mixing, the mortar thus obtained was poured into a mold and left to cure at ambient temperature in order to obtain prisms with dimensions of 4×4×16 cm. The test specimens were then removed from the mold after 24 hours and tested in the bending test and then in the simple compression test at 7 days and at 28 days according to standard NF EN 196-1.

The results of the mechanical strengths obtained for the mortars formulated according the invention are summarized in table 2 below.

The above examples clearly show that the partial replacement of the metakaolin by a non-thermally activated aluminosilicate, which is advantageous from an economic viewpoint, does not affect or very slightly affects the bending strength and the compressive strength at 28 days, in particular in the presence of superplasticizer according to the invention.

It will be noted that a person skilled in the art would have expected that the decrease in the amount of metakaolin would require an increase in the amount of alkaline silicate solution or the use of "corrosive" alkaline solutions. It is thus highly surprising to be able to obtain mortars based on geopolymer cement having a reduced metakaolin content while being listed in the category of "irritant" materials.

Very remarkably, it is also possible to significantly reduce the amount of alkaline silicate solution used, by adding a superplasticizer of "carbomer" type to the geopolymer cement, while retaining or improving the mechanical properties of the mortars obtained from said cement. Indeed, when comparing the results obtained in Examples 8 to 12, it is noticed that it is possible to reduce the amount of alkaline silicate solution by approximately 40% by using a crosslinked acrylic acid homopolymer. The total cost of the production of a mortar and its impact on the environment are therefore significantly reduced.

The invention claimed is:

1. A geopolymer cement comprising:
   a) a metakaolin;
   b) an alkaline silicate solution having a molar ratio $M_2O:SiO_2$, between about 0.51 and 0.60, M representing Na or K; and
   c) a crosslinked acrylic acid homopolymer as a superplasticizer.

TABLE 2

| Strengths (MPa) | Ex. 1 | Ex. 2 | Ex. 3* | Ex. 4* | Ex. 5 | Ex. 6* | Ex. 7 | Ex. 8 | Ex. 9* | Ex. 10* | Ex. 11* | Ex. 12* | Ex. 13 | Ex. 14* | Ex. 15** |
|---|---|---|---|---|---|---|---|---|---|---|---|---|---|---|---|
| Bending at 7 d | 6.46 | 6.15 | 7.67 | 9.31 | 4.96 | 5.56 | 5.54 | 4.9 | 6.86 | 7.96 | 8.38 | 9.86 | — | 4.60 | — |
| Compression at 7 d | 40.64 | 39.87 | 39.97 | 56.00 | 30.30 | 34.25 | 38.16 | 34.91 | 41.45 | 43.4 | 47.3 | 55.07 | — | 31.10 | — |
| Bending at 28 d | 5.85 | 6.77 | 9.06 | 10.44 | 5.57 | 6.20 | 6.42 | 6.02 | 8.57 | 9.09 | 9.52 | — | 4.78 | 4.84 | 10.95 |
| Compression at 28 d | 42.64 | 40.75 | 48.60 | 56.65 | 32.72 | 39.41 | 39.27 | 43.76 | 46.76 | 50.87 | 51.80 | — | 28.63 | 31.45 | 54.14 |

*indicates the presence of a superplasticizer
**indicates the presence of a superplasticizer and of reinforcing fibers 2. The geopolymer cement as claimed in claim 1, further comprising a non-thermally activated aluminosilicate with a metakaolin:aluminosilicate weight ratio between about 40:60 and about 80:20.

3. The geopolymer cement as claimed in claim 2, wherein the non-thermally activated aluminosilicate is selected from the group consisting of a kaolin, a bentonite, flyash, a blast furnace slag and their mixtures.

4. The geopolymer cement as claimed in claim 3, wherein the non-thermally activated aluminosilicate is a kaolin or a bentonite.

5. The geopolymer cement as claimed in claim 1, wherein the alkaline silicate solution has a molar ratio $M_2O:SiO_2$, between 0.53 and 0.57.

6. The geopolymer cement as claimed in claim 2, wherein the metakaolin:aluminosilicate weight ratio is between about 50:50 and about 80:20.

7. The geopolymer cement as claimed in claim 1, wherein the alkaline silicate solution has a molar ratio $M_2O:SiO_2$ between about 0.51 and 0.57.

8. The geopolymer cement as claimed in claim 1, wherein the crosslinked acrylic acid homopolymer is an acrylic acid homopolymer crosslinked with polyalkenyl ethers or divinyl glycol.

9. The geopolymer cement as claimed in claim 2, wherein the crosslinked acrylic acid homopolymer is an acrylic acid homopolymer crosslinked with polyalkenyl ethers or divinyl glycol.

10. The geopolymer cement as claimed in claim 1, in which M represents Na, and in the geopolymer cement as a whole:
   the molar ratio $SiO_2:Al_2O_3$ is between about 4.0 and about 5.2;
   the molar ratio $Na_2O:SiO_2$ is between about 0.2 and about 0.3;
   the molar ratio $Na_2O:Al_2O_3$ is between about 0.85 and about 1.4; and
   the molar ratio $H_2O:Na_2O$ is between about 14.5 and about 16.5.

11. The geopolymer cement as claimed in claim 2, in which M represents Na, and in the geopolymer cement as a whole:
   the molar ratio $SiO_2:Al_2O_3$ is between about 4.0 and about 5.2;
   the molar ratio $Na_2O:SiO_2$ is between about 0.2 and about 0.3;
   the molar ratio $Na_2O:Al_2O_3$ is between about 0.85 and about 1.4; and
   the molar ratio $H_2O:Na_2O$ is between about 14.5 and about 16.5.

12. A mortar or concrete comprising a geopolymer cement as claimed in claim 1, and aggregates.

13. A mortar or concrete comprising a geopolymer cement as claimed in claim 2, and aggregates.

14. The mortar or concrete as claimed in claim 12, further comprising fibers.

15. The mortar or concrete as claimed in claim 14, wherein said fibers are organic fibers.

16. A grout or cement paste comprising a geopolymer cement as claimed in claim 1.

17. A grout or cement paste comprising a geopolymer cement as claimed in claim 2.

18. A method of manufacturing a geopolymer cement, mortar, concrete or grout which comprises using a crosslinked carboxylic acid homopolymer as a superplasticizer.

19. The method as claimed in claim 18, in which the crosslinked carboxylic acid homopolymer is an acrylic acid homopolymer crosslinked with polyalkenyl ethers or divinyl glycol.

* * * * *